United States Patent [19]
Owen

[11] 3,848,863
[45] Nov. 19, 1974

[54] WELDING JIG

[75] Inventor: Harold W. Owen, Los Alamitos, Calif.

[73] Assignee: Pullman Incorporated, Chicago, Ill.

[22] Filed: May 3, 1973

[21] Appl. No.: 356,860

[52] U.S. Cl............................ 269/9, 228/48, 269/45, 269/71, 269/296
[51] Int. Cl............................................. B23k 37/04
[58] Field of Search................... 29/200 P; 214/1 P; 219/157–159; 269/55, 57, 71, 73, 17, 296, 9, 45; 228/44, 48, 49

[56] References Cited
UNITED STATES PATENTS

| | | | |
|---|---|---|---|
| 2,459,280 | 1/1949 | Lange et al. | 248/351 X |
| 2,479,197 | 8/1949 | Anderson | 219/159 |
| 2,483,811 | 10/1949 | Cullen | 269/71 X |
| 3,162,160 | 12/1964 | Brown | 269/9 |
| 3,618,845 | 11/1971 | Totten | 228/44 |
| 3,772,753 | 11/1973 | Sargeant | 29/200 P |

Primary Examiner—Roy Lake
Assistant Examiner—Neil Abrams

[57] ABSTRACT

An apparatus for use in supporting tubular goods such as pipe for welding to flanges, elbows, reducers, and the like, which incorporates a pair of elongate parallel rails on which similar carriages roll, the carriages each including means raising and lowering a turntable on the carriages, the turntable being rotated about a vertical axis and having locked positions which enable the turntables to position fittings for welding to a pipe, the apparatus further including pipe supports which selectively erect between the rails to support a pipe at a specified elevation, the pipe support including rollers which support a pipe for rotation, and including a power unit for rotating a roller causing pipe to rotate, thereby enabling a bead to be welded around the pipe. This enables the pipe to be connected to a fitting supported on a movable carriage.

13 Claims, 10 Drawing Figures

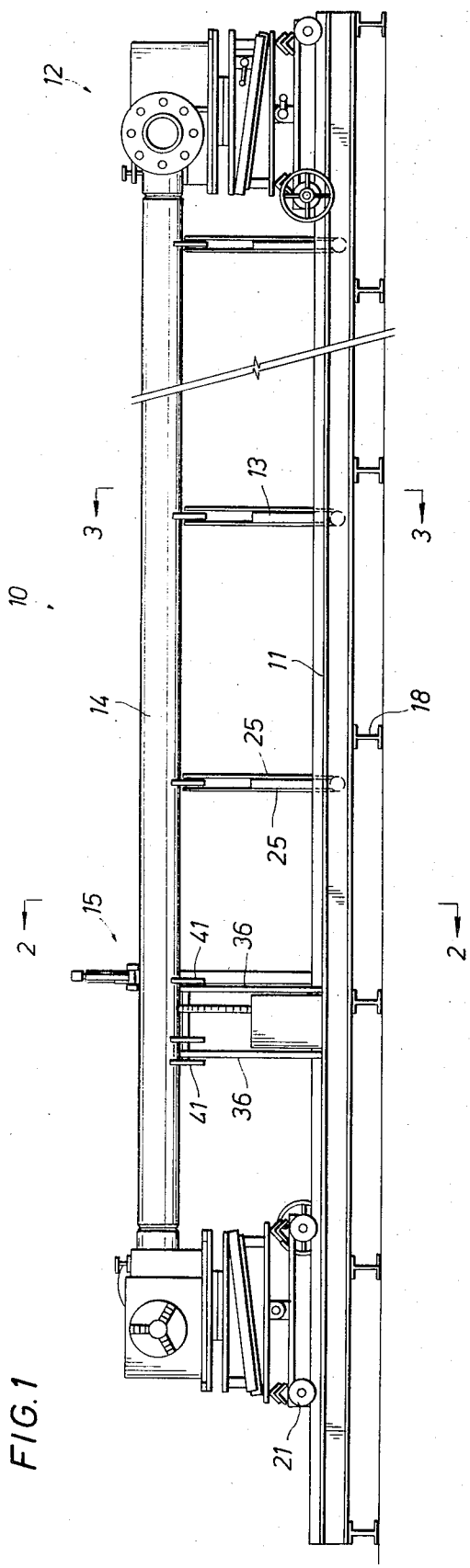
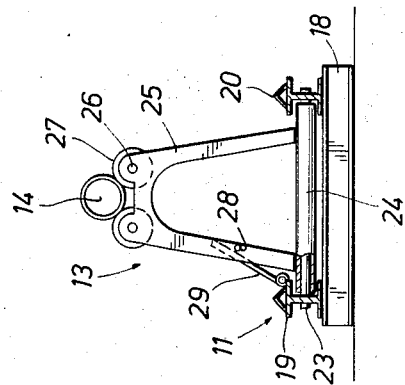
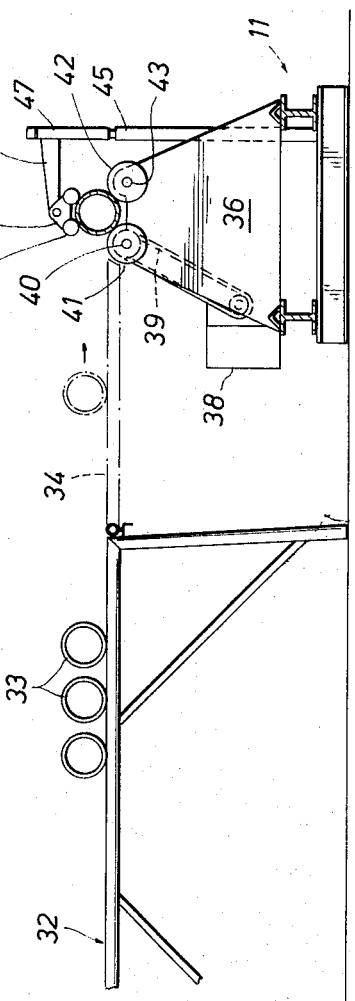
FIG.1
FIG.3
FIG.2

WELDING JIG

BACKGROUND OF THE INVENTION

As disclosed in the prior art patents, attempts have been made to provide equipment for holding a pipe while a jig or fixture is welded to it. Several of the references disclose jigs and fixtures which are limited in purpose and application. The present invention supplies a need found in the fabrication of pipe and various fittings as might be used in erection of a petrochemical or refining complex. The variety of pipe sizes and fittings is legion. The designers have a free hand in sizing pipes and fittings in a variety of arrangements substantially without limitation. A particular welded joint may not be repeated in a substantial complex even though the number of pipes and fittings in the complex may be quite large. Fabrication of pipes and fittings in place is generally undesirable. It is undesirable from several points of view, including the cost of labor and lack of precision or accuracy. The present invention is intended to provide and has successfully demonstrated a capability of fabricating piping configurations of all sizes and shapes, including all types of fittings in a shop with a high degree of speed and accuracy. The fittings are fabricated under more controlled circumstances, enabling the fabrications to qualify under the appropriate safety codes.

SUMMARY OF THE INVENTION

The apparatus of the present invention is a welding jig which includes a pair of parallel rails which support at least two movable carriages. The carriages are preferably identical, and differ only in location to enable the attachment of fittings at either end of a piece of pipe. The carriages include wheels which enable them to move along the tracks. A turntable is mounted for rotation about a vertical axis. The turntable supports a number of clamps which index to the specified orthagonal locations. The carriage includes apparatus for raising and lowering the turntable. It is adjustable laterally. A number of pipe supports are located between the rail. They have two positions, one being erect and the other being retracted below the rails to enable the carriages to pass over when the pipe support is not needed. One support is provided with a powered roller which causes pipe engaged with the roller to rotate so that a bead can be welded fully about the pipe and fittings to be connected to the pipe.

The apparatus is adjustable to accommodate a wide range of pipe sizes. The carriages accomodate fittings of different sizes and shapes, including but not limited to tees, reducers, elbows, and the like.

DESCRIPTION OF THE DRAWINGS

FIG. 1 is a side view of the welding jig of the present invention illustrating an arrangement whereby movable carriages are supported on rails and pipe supports are erected between the carriages to support a pipe for welding to fittings on the movable carriages;

FIG. 2 is a sectional view along the line 2 — 2 of FIG. 1 showing the relationship of the welding jig of the present invention to a pipe storage rack and illustrating details of construction of the pipe rotating mechanism which enables welding a bead fully about the pipe;

FIG. 3 is a sectional view along the line 3 — 3 of FIG. 1 showing details of construction of a pipe support which can be erected to support a pipe or which can be lowered to a point between or below the rails to an out-of-the-way position, enabling the carriages to pass thereover;

DESCRIPTION OF THE PREFERRED EMBODIMENT

Figure 4:
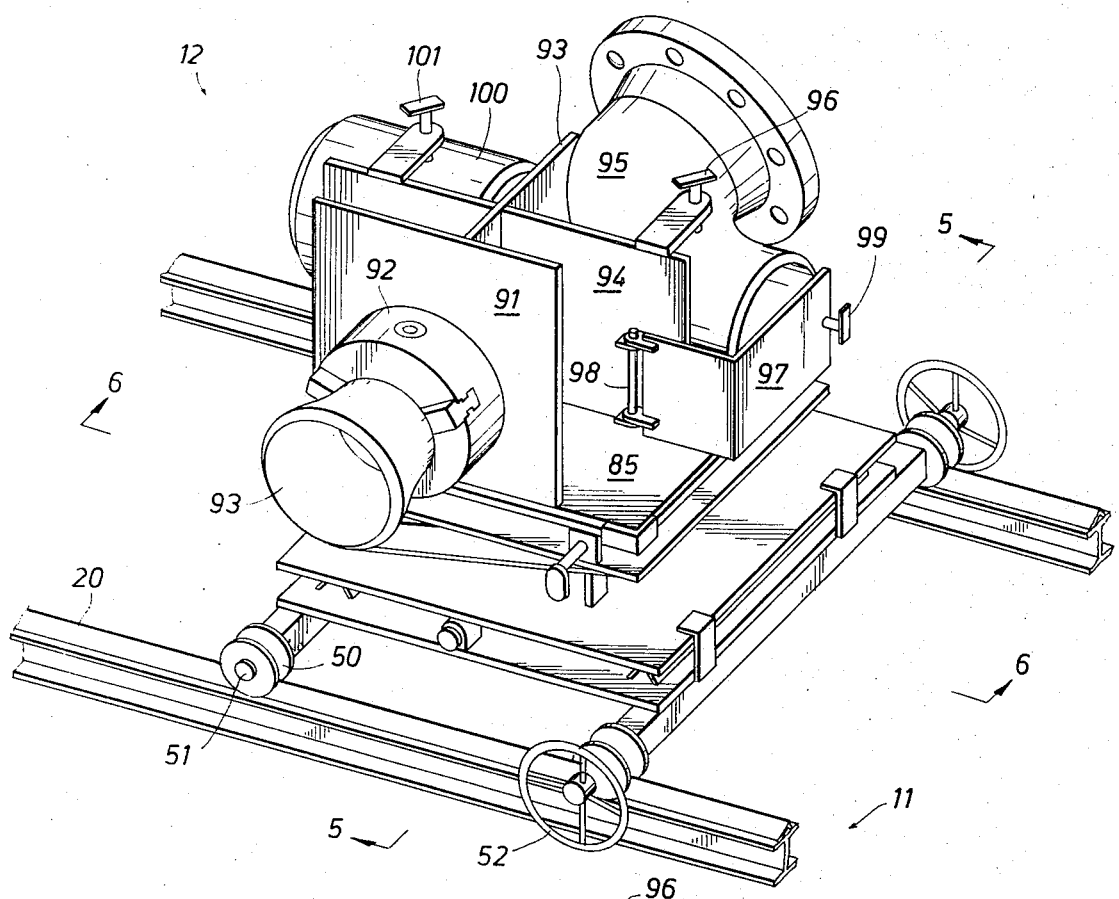
FIG. 4 is an enlarged perspective view of a single carriage, the preferred embodiment including two or more similar carriages.

In FIG. 1, the welding jig 10 includes several main assemblies. It includes a pair of elongate rails 11 which are parallel, of equal length, and of identical construction in the preferred embodiment. The rail 11 exceeds in length the longest pipe to be handled by the apparatus by a measure sufficient to enable similar carriages 12 to be supported on the rails. In the preferred embodiment, at least one carriage is incorporated, and there are preferably two. More can be placed on the rails as desired, although this is not normally required. The apparatus includes a number of pipe supports 13 which are erected between the rails. The pipe supports align and support an individual pipe 14. The pipe 14 is centered and held at a specified elevation by the pipe supports 13. The pipe 14 is rotated by a turning mechanism 15. It preferably engages the pipe with a rotating roller which turns the pipe, enabling a welder to stand at one place and weld fully about the circumference of the pipe 14. The pipe 14 is joined to a fitting at either or both ends, the variety of which is not significant to this description.

Attention is directed to FIG. 3 where a laterally extending bed or frame member 18 is shown. The member 18 is duplicated at numerous locations along the length of the equipment. It supports a pair of similar rails 11. The rails 11 are preferably fabricated from an I-beam 19, and include an angle stock 20 welded along the top flange plate of the I-beam with the outside of the angle stock positioned and centered along the top flange. The angle stock 20 defines a fairly sharp edge which guides the carriages 12 as will be described, and serves as a reference, eliminating the necessity of remeasuring the lateral location of the carriages after movement. The carriages 12 are equipped with wheels 21 as shown in FIG. 1 which rest on the angle stock 20 which comprises a portion of the rail. The wheels 21 have a profile which matches the shape of the rails 11.

The rails 11 rest on the bed or frame members 18 which fix the gauge of the rails. As previously mentioned, the rails can be of any length selected to accommodate different lengths of pipe.

A shaft 23 shown in FIG. 3 extends between the I-beams 19. The shaft 23 passes through a surrounding sleeve 24 which is connected to an upstanding generally U-shaped member 25. The U-shaped member 25 is welded to the sleeve 24 at both ends as shown in FIG. 3. In FIG. 1, the pipe support 13 is shown to include a pair of U-shaped members 25. They are spaced from one another to support a shaft or axle 26 which supports a roller 27 between the U-shaped members 25. The roller 27 is duplicated at symmetrical locations on the pipe support 13 as shown in FIG. 3. Similar rollers are included on the right and on the left. The rollers are centered with respect to the rails 11 to define a means giving center line support for a tubular member. The rollers 27 cooperate with the pipe 14 to rotate it about an axis which coincides vertically with the center line of the equipment. The apparatus functions over a wide range of pipe diameters. If the pipe 14 were substantially larger, it would still be centered although its axis would be higher.

The pipe support 13 has two positions. One is the erected position shown in FIG. 3. To achieve and maintain this position, a lock mechanism is included. The lock mechanism includes a pin 28 which passes through the two U-shaped members 25. It is located at one side or the other. A lock member 29 is pivotally joined to the inside of one of the rails 11. The lock member 29 swings toward the vertical from the position illustrated in FIG. 3 to clear the space between the U-shaped members 25. The lock member 29 is sized to fit in the space between the adjacent U-shaped members 25. When it is placed in this space, it can move in a clockwise direction as shown in FIG. 3 to rest on the pin 28. The pin limits angular rotation. When it is in the position of FIG. 3, it locks the pipe support in the up position.

Referring to FIG. 1, the lock member 29 can be temporarily moved to a near vertical position and the entire pipe support member 13 rotated in a counterclockwise direction from the vertical position to a position approximately horizontal or at a slightly depressed angle. This places the pipe support 13 fully between the rails at a location which does not interfere with the moving carriages 12. This is advantageous when the welding jig 10 is fabricated to handle long pieces of pipe, perhaps 50 feet, and yet required to support and work on pieces of pipe shorter than 5 or 10 feet. The pipe supports 13 are located at specified distances along the rails. A sufficient number is included to support almost any size and length of pipe. When required, they can be erected in the vertical position of FIG. 3, or retracted to a position below or between the rails to enable the carriages 12 to pass over them.

In FIG. 2, a generally horizontal pipe storage rack 32 is shown. The pipe rack 32 includes an upper surface which supports a number of pieces of pipe generally indicated at 33. The pipe rests on several parallel members which comprise the pipe rack 32. At the edge of the pipe rack, closer to the rails 11, an arm 34 is pivotally mounted and is adapted to swing toward the welding jig 10. In FIG. 2, it is shown extending to the right to the vicinity of the rollers 27 of the pipe supports 13. This enables an individual piece of pipe to be stored on the pipe rack 32 and enables it to be rolled across the pipe rack, extendable arm 34, and onto the pipe supports 13. This avoids the necessity of lifting and enables the personnel to handle pipe quite rapidly without the use of power equipment.

FIG. 2 includes a pipe support which is powered. The pipe support of FIG. 3 is passive in that the rollers 27 are not driven, but merely support the pipe 14 which rests on the rollers and enable it to rotate. The powered apparatus of FIG. 2 need not be duplicated. One pipe rotating apparatus is sufficient for the equipment. It is normally held erect at all times because it is required in practically all manipulations of pipe on the welding jig 10. In FIG. 2, a generally triangular support member 36 is vertically erected above the rails 11. The support member 36 is preferably duplicated at spaced locations along the length of the welding jig 10. The triangular plates 36 define an open space there between where the motor and gear box assembly 38 is positioned. The motor and gear box provide power to a link chain or belt 39 which extends from the motor 38 to a gear about a shaft 40. The shaft 40 supports a pair of drive wheels 41 which are adapted to engage the pipe 14 which rests on the equipment and impart rotation to it. The equipment is symetrically constructed so that an idler wheel 42 received on a parallel shaft 43 is located on the right side of the equipment. The wheels or rollers 41 and 42 are jointly centered. They preferably do not stand any taller than the rollers in the pipe support 13. An individual pipe resting on the welding jig may contact several pipe supports 13, and equal contact should be maintained with the rollers of each pipe support. The same is true of the driven pipe support mechanism shown in FIG. 2. The wheels 41 and 42 preferably have equal diameter to those shown in FIG. 3, and have coincident axes.

It should be observed from the foregoing how the active and passive pipe supports cause the pipe to rotate. It should be understood how a pipe having any diameter above a specified minimum, and having any reasonable length, is supported and rotated by the mechanism described above. It is located along the center line of the equipment to avoid the difficulty of making repeated measurements to determine the location of the pipe so that fittings can be added later.

In FIG. 2, an upstanding post 45 is shown. An arm 46 connects to a tubular member 47 which is telescoped relative to the upright member 45. The telescope member 47 is raised and lowered. It is preferably lowered by the inclusion of substantial weight or a resilient coil spring between the two members which forces the arm 46 downwardly. The arm 46 is momentarily raised to position a generally triangular plate 48 above the pipe 14. The plate 48 supports guide rollers 49 which contact the top side of the pipe 14. The rollers 49 force the pipe downwardly into firmer contact with the driven rollers 41. This assures that the pipe does not bounce up and down or jiggle around on the rollers which support it. This enables the equipment to keep the pipe trued to a specified center line axis during rotation. The arm 46 can be raised and lowered to accommodate pipes of different sizes. Changes in diameter of the pipe do not alter operation of the rollers 49 which force it downwardly.

In FIG. 1, the driving apparatus for the pipe includes duplicate driven rollers 41 at several locations. This assures sufficient contact with the pipe to cause it to be rotated by the equipment.

Attention is directed to the carriages 12 which were first introduced in FIG. 1. Two or more carriages are incorporated in the preferred embodiment. In FIG. 4, the carriage 12 incorporates a set of wheels or rollers 50 which are mounted on shafts 51 which span the carriage at front and rear. One shaft 51 is equipped with a hand wheel 52 enabling the user to rotate the shaft, thereby moving the carriage 12 along the rails 11. As desired, hand wheels can be located on both sides of the equipment. It is not necessary to place a hand wheel on both axles.

Figure 5:
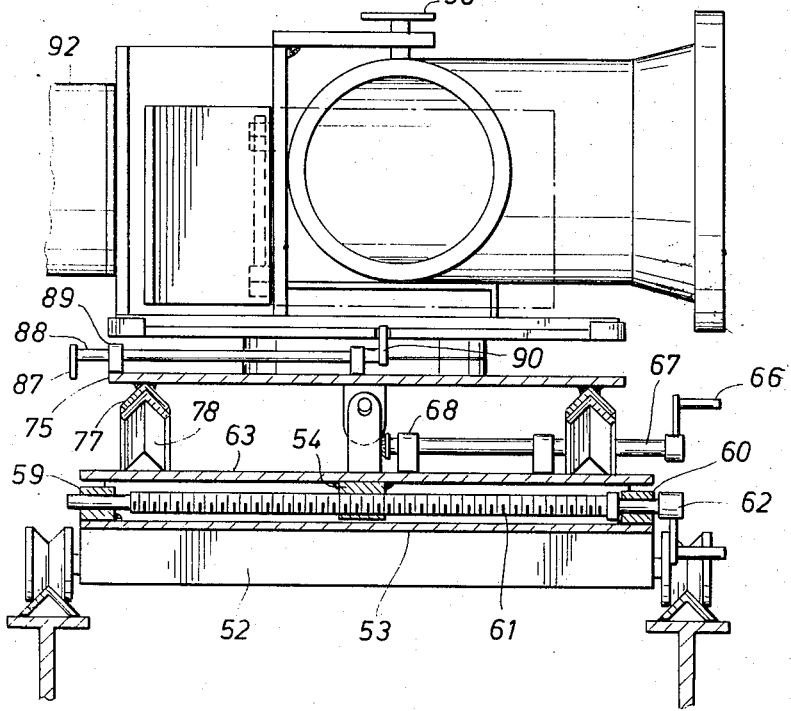
FIG. 5 is a sectional view taken along the line 5 — 5 of FIG. 4 illustrating details of construction of the carriage, including apparatus moving a turntable on the carriage.
Figure 6:
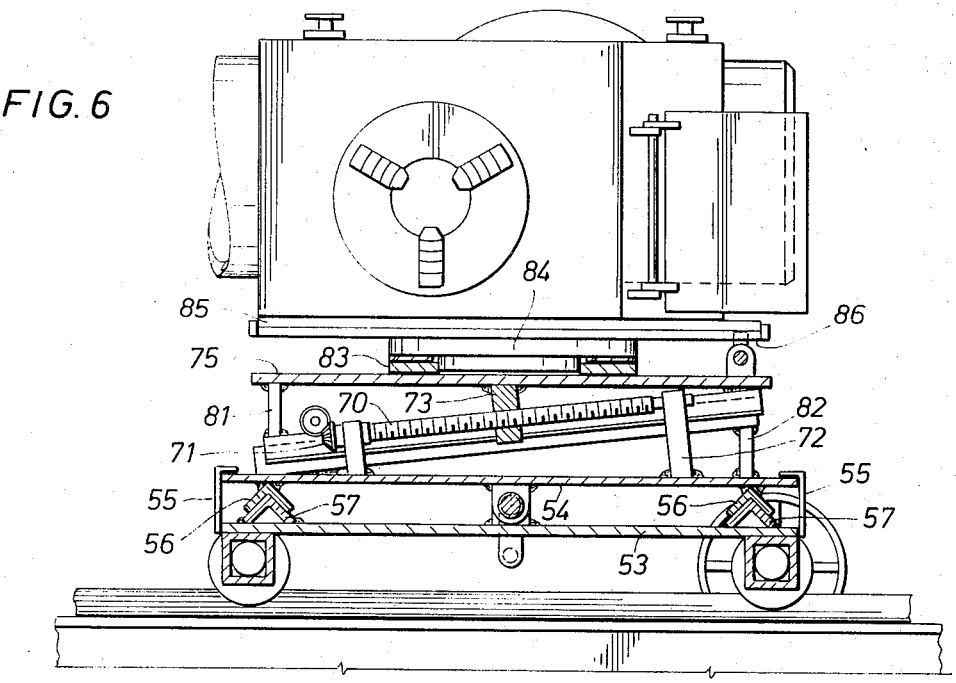
FIG. 6 is a longitudinal sectional view along the line 6 — 6 of FIG. 4 through the carriage and showing details of construction of the mechanism for elevating the carriage and moving it transversely.

The shaft 51 extends through a surrounding housing 52 which serves as a transverse frame member. Two such members are included, one at the front and one at the rear. The transverse frame member 52 supports a bottom plate 53 (see FIG. 5) which is fixed to the transverse frame member 52. The plate 53 supports a parallel plate 54 which is spaced above it. This is better shown in FIG. 6. The plate 54 is prevented from moving from its specified position above the plate 53 by L-shaped clamps 55 which are attached on the ends of the equipment. In FIG. 6, the plate 54 can move laterally with respect to the tracks, but is limited in other directions.

On the lower side of the plate 54, a downwardly facing piece of angle stock 56 is welded. A similar piece of angle stock 57 is welded to the top side of the plate 53. This is accomplished at two locations as shown in FIG. 6. The angle stock defines a downwardly facing guide channel and an upwardly facing contoured edge, the two conforming in cross section to engage one another and guide the plate 54 in lateral movement with respect to the plate 53.

Returning to FIG. 5, a pillow block 59 is welded to the plate 53. A similar block 60 is found on the opposite side. A threaded shaft or long screw 61 passes through the blocks 59 and 60. A handle 62 on one end of the screw 61 enables it to be hand rotated or operated. The shaft 61 engages a traveling nut 63 which is welded to the lower side of the plate 54. The traveling nut 63 is driven to the right or left, as shown in FIG. 5, by rotation of the lead screw 61. Rotation in one direction moves the nut to the left and the plate 54 with it. Rotation in the opposite direction moves the plate 54 in the other direction. This enables the carriage 12 to accomodate small variations in lateral alignment.

The plate 54 supports additional equipment enabling adjustments in position of the carriage. Another handle 66 is attached to a shaft 67. The shaft 67 extends through a set of guide blocks 68 and has a bevel gear on its end. The bevel gear engages a mating bevel gear mounted on a shaft 70. The shaft 70 is perpendicular to the shaft 61 and as shown in FIG. 6, extends at a slightly upward angle. It passes through a short pillow block 71 and through a taller pillow block 72. The blocks 71 and 72 cant the shaft 70 and are welded to the top side of the plate 54. The shaft 70 is threaded and engages a traveling nut 73. The traveling nut 73 extends from the lower side of a plate 75 which is parallel to and spaced above the plate 54. The blocks 71, 72 and 73 all extend at a non-perpendicular angle with respect to the plates 54 and 75. This causes the plate 75 to be raised and lowered when the shaft 70 is rotated. The shaft 70 passes through a threaded opening in the traveling nut 73 and functions similarly to the shaft 61 and traveling nut 63 previously described.

The plate 75 is raised and lowered with respect to the plate 54. As shown in FIG. 5, this movement is accomplished as the plate 75 moves along the screw 70. The vertical motion is accompanied by some horizontal displacement. The plate 75 is supported on a pair of downwardly facing channel members 77 (see FIG. 5). The channel members 77 are on opposite edges of the plate 75. They face or open downwardly and are rested on similar or matching channel members 78. The channel members 78 are attached to the lower plate 54. As shown in FIG. 6, the channel members 77 and 78 extend at angles with respect to the plates to which they are attached. The uppermost channel member 77 is welded at one end directed to the plate 75 and at its other end, is separated by a spacer bar 81. The channel 78 is attached to the plate 54 at its left-hand end (see FIG. 6) and its right-hand end is elevated by a similar spacer bar 82. The spacer bars 81 and 82 serve as stand offs, positioning the channel members 77 and 78 at the desired angle. The plate 75 remains generally horizontal and parallel to the plate 54.

In FIG. 6, the bottom plate 83 of a turntable which rotates about a central shaft mates with a facing turntable plate 84. The turntable plate 84 attaches to a bottom plate 85 which is parallel to the plate 75 and the other flat plate previously mentioned. The plate 85 is able to be rotated about the central axis of the turntable. The plate 85 is generally rectangular except that a notch is cut at 86 and is preferably duplicated at the center point of all four edges of the plate 85. In the preferred embodiment, the plate 85 is preferably square and rotates about an axis at its center. The notch 86 enables a lock mechanism to lock it at controlled quarter revolution locations. The lock mechanism is better illustrated in FIG. 5 as including an external handle 87 connected to a shaft 88 supported by a pair of upstanding blocks 89 and terminating in a lateral projection or tab 90 which falls into the notch 86 on rotation. This enables the plate 85 to be rotated to a position and rapidly locked. If desired, additional notches can be incorporated to obtain rotation to other angles. Rotation through 90° is normally the most desirable.

The plate 85 supports an upstanding vertical plate 91 which supports a centered chuck 92, all shown in FIG. 4. The chuck 92 includes three or four jaws and is able to grasp a fitting such as a reducer bell 93. Preferably the plate 91 is centered with respect to the plate 85 on which it is supported, and is able to position the chuck 92 at a center line position with respect to the carriage 12. The plate 85 supports other vertical plates, including the plate 93 which intersects a similar plate 94. The plate 94 aids in supporting an elbow 95. The elbow 95 is held in position from the top side by means of a projecting tab which carries a threaded bolt 96 which is threaded onto the top side of the elbow 95. It is squared at one end by means of a hinge plate 97 which is held on the plate 94 by a hinge 98. It contacts the elbow by means of a similar bolt 99. The plates 93 and 94 define a pair of perpendicular walls which aid in positioning a short pipe section 100. It is held in position by a bolt 101 which is supported by a cantilevered tab. The bolts 96, 99 and 101 all function in like manner and are selectively operated to lock a fitting to the carriage 12 to enable the fitting to be held at a specified location. Considering operation of the carriage 12, it is hand operated by rotation of the wheel 52 to traverse the rail. It is adjusted in position laterally across the rail by operation of the handle 62. The handle 62 moves the plate 54 along a transverse line across the rail. It is raised and lowered in height by operating the handle 66. This raises and lowers the plate 75 above the plate 54. Vertical movement is accompanied by some horizontal movement which can be compensated for by moving the wheels under the carriage. A third type of movement is permitted upon rotation of the top plate 85 about the turntable. The axis is preferably perpendicular to the plane of the rails 11 and is centered between the rails. The centering can be altered by operation of the handle 62 previously mentioned.

Figure 7:
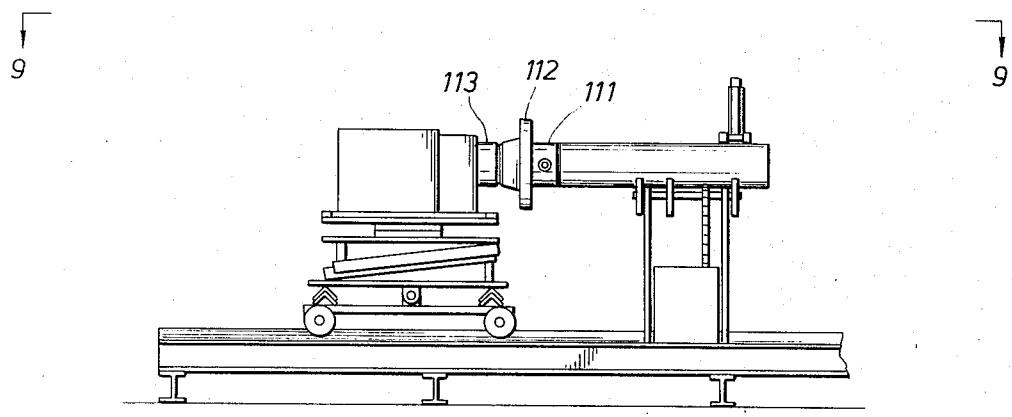
FIG. 7 shows in side view a single carriage cooperating with a short piece of pipe for attaching a fitting to the pipe.
Figure 8:
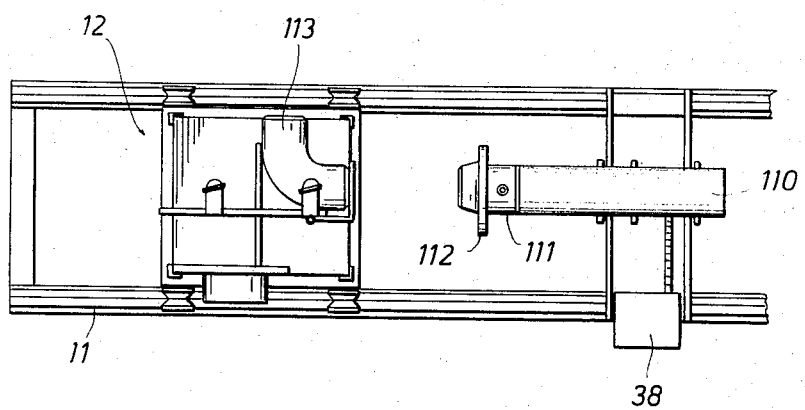
FIG. 8 is a top view of the apparatus showing a method of aligning a flange where the flange is to be attached to an elbow.

Attention is directed to FIG. 8 which shows one method of use of the welding jig of the present invention. A short piece of pipe 110 supports a chuck 111 which supports a flange 112. The flange 112 is axially aligned with the equipment. The carriage 12 in FIG. 8 is shown supporting an elbow 113. The facing end of the elbow 113 is axially aligned with the pipe 110. The carriage 12 supports the elbow 113 is a spaced apart position. The two are then moved close together as shown in FIG. 7. This positions the flange 112 adjacent to the elbow 113. The two items are exposed so that the welder can tack the two together with several beads about the periphery.

Figure 9:
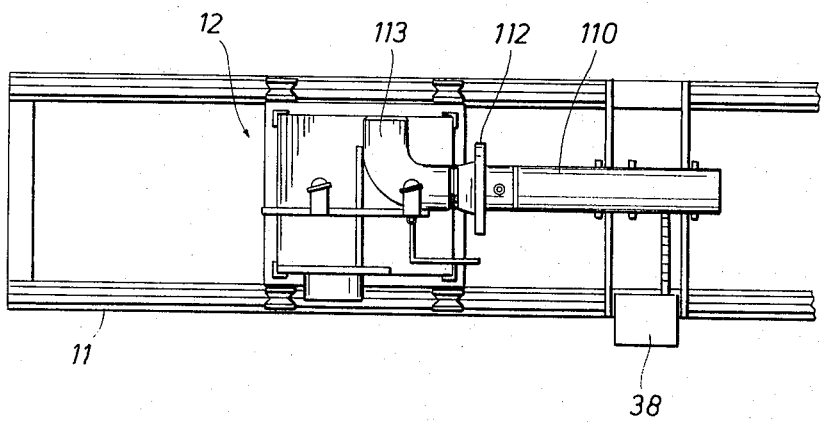
FIG. 9 is a view similar to FIG. 8 showing the carriage moved along the track to closer proximity with the pipe so that the flange abuts the elbow; and, FIG. 10 shows the turntable rotated to position the elbow for connection to a pipe, the carriage having moved along the track and a different piece of pipe supported on the pipe support.

The manner in which the two members are brought together is illustrated in FIG. 9. The carriage 12 is moved along the tracks 11 until it is in an abutting position with the flange and the welded bead is added. After the elbow 113 has been tacked to the flange 112, the carriage is disconnected from the elbow 113. The carriage is backed away. This then leaves the elbow attached to the flange 112, both being supported by the pipe 110. It will be recalled from FIG. 7 that the pipe is supported on its top side by rollers forced into contact with it.

The motor 38 is turned on and the pipe 110 is then rotated at a specified speed. The speed of rotation exposes the entire circumference for welding. The welder can stand in one position and weld the entire bead about the flange 112.

Figure 10:
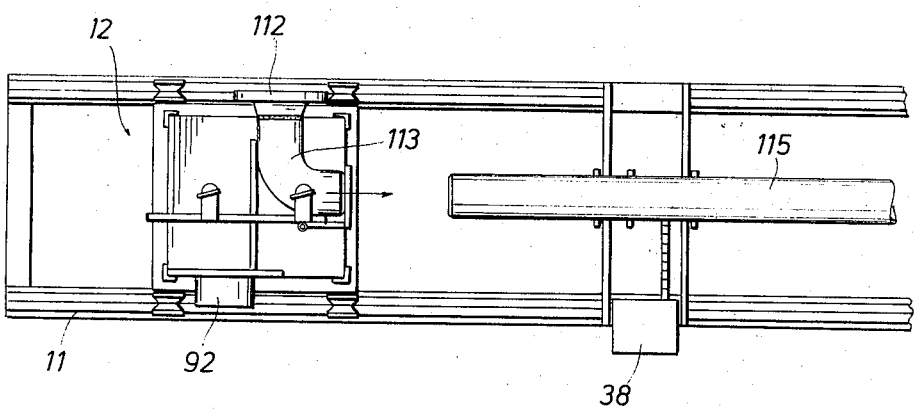

Attention is directed to FIG. 10 where the flange 112 projects to the side of the carriage 12 and the elbow 113 is repositioned on the carriage 12. It is axially aligned with a pipe section 115. The carriage is moved into a point of contact with the pipe section 115. Several tack welds are placed about the circumference to secure the flange. The motor 38 is actuated to rotate the facing bevels so that the entire bead can be placed by the welder standing in one position.

The carriage 12 incorporates a chuck 92 which can be used to align reducers and the like. The turntable in the carriage enables individual fittings to be quickly indexed from a lateral position to a centered and facing position for joinder to a pipe.

The present invention is advantageous in the use of two carriages. This enables the connection of fittings at both ends of the pipe. It is unnecessary to over-extend the drawings to incorporate additional representative steps showing the two carriages in operation cooperative with the pipe support mechanism. Two carriages can be used to attach fittings on the ends of a very long piece of pipe which requires as many as five or six pipe supports. The pipe supports 13 are erected in the manner shown in FIGS. 1 and 3, and can be retracted and laid down, resting between the rails in an out-of-the-way position to enable subsequent passage of the carriages 12 over them.

When two carriages are used, the operation requires some coordination between the two carriages. They must both be adjusted to axially coincide with the single pipe. The fittings on the two carriages must be tack welded, both carriages withdrawn, and the motor 38 operated to rotate the pipe. The final welds can be placed at both ends simultaneously.

The preferred embodiment has been described in substantial detail. A method of use or operation has also been set forth. The scope of the invention is determined by the appended claims.

I claim:

1. A welding jig comprising
   a set of elongate rails defining a first axis of specified length;
   means transversely attached to said rails;
   at least a pair of aligned selectively erectable pipe support means pivotally supported on said attached means and which are erectable to a pipe supporting position above and parallel to the first axis and which are further movable to a retracted position clearing said rails for movement therealong;
   carriage means supported on said rails;
   means for moving said carriage means along said rails and past said pipe support means when said pipe support means is in the retracted position;
   rotatable means carried by said carriage means and having an axis of rotation generally perpendicular to the first axis; and
   said rotatable means holding a pipe fitting at a specified position relative to a pipe prior to attachment to the pipe supported on said pipe support means.

2. The apparatus of claim 1 wherein
   said pipe support means includes a fixed axis means perpendicular to the first axis, a sleeve means engaging said fixed axis means, a pair of spaced pipe engaging rollers, and an upright frame supported by said sleeve means and supporting said rollers for movement to an upright pipe supporting position above said rails from the retracted position.

3. The apparatus of claim 1 including a second pipe support means which includes a motor driven pipe rotating roller means, and the first pipe support means includes a pipe engaging roller means, said roller means supporting a pipe along the first axis for rotation, and means pivotally supporting said first pipe support means for rotation to an erect position and for rotation to the retracted position clearing said rails for movement therealong by said carriage means.

4. The apparatus of claim 1 wherein
   said rails include a pair of spaced parallel rails;
   said pipe support means includes an axis means perpendicular to said rails, a sleeve means engaging said axis means, a frame connected to said sleeve means for rotation to an erect position between said rails and elevated thereabove from a retracted position between said rails, and pipe engaging rollers on said frame for rotatably supporting a pipe thereon;
   said carriage moving means includes a set of wheels rolling along said rails which roll said carriage means over said pipe support means in the retracted position; and said rotatable means on said carriage means rotates about a vertical axis, and further including means for moving said rotatable means vertically and laterally along two axis perpendicular to the first axis.

5. The apparatus of claim 1 wherein said carriage means includes
a set of wheels for engaging said rails;
a first frame member carried by said wheels;
a laterally movable second frame member;
first means for moving said second frame member laterally with respect to the first axis;
a third frame member supported at least indirectly by said first frame member;
second means for moving said third frame member vertically relative to the first axis;
a turntable supported at least indirectly by said first, second and third frame members and comprising a portion of said rotatable means, said turntable providing compound movement laterally and vertically relative to the first axis on operation of said first and second means to locate a fitting held by said rotatable means.

6. A welding jig comprising:
a pair of horizontally disposed parallel rails;
means transversely attached to said rails;
at least a pair of aligned selectively erectable pipe support means pivotally supported on said attached means and adapted to extend vertically above said rails and also adapted to move to a position clearing said rails for movement therealong;
a first carriage means supported on said rails;
roller means for moving said carriage means along said rails when cleared of said support means;
first rotatable means carried by said carriage means and having an axis of rotation vertical relative to said rails; and
rotatable means carried by one of said pipe support means and adapted to rotate with a tubular member supported by said pipe support means with rotation about the central axis of the tubular member and wherein said first rotatable means is adapted to move a fitting along said rails into a desired spatial relationship relative to the tubular member for joinder thereto.

7. The apparatus of claim 1
wherein said rails are parallel rails in a horizontal plane;
wherein said means for moving said carriage means includes a set of wheels engaging said rails; and
wherein said pipe support means are pivotally mounted on a horizontal shaft which comprises said attaching means between said rails allowing said carriage means to pass over.

8. The apparatus of claim 1 wherein said pipe support means includes a pair of spaced rollers exposed on top for supporting a tubular member thereon.

9. The apparatus of claim 1 wherein one of said pipe support means includes a driven top located roller for engaging a tubular member and rotating it.

10. The apparatus of claim 1 including a latch means for securing said pipe support means in an upright position, said latch means releasing said support means for rotation to a withdrawn position.

11. The apparatus of claim 1 wherein said pipe support and attached means include
a generally upstanding frame member;
a sleeve;
a shaft in said sleeve;
one of said shaft or said sleeve being connected to said frame member and the other being connected to said rails to support said frame member pivotally between said rails for movement to an upright position between and above said rails and a second position between and below said rails; and
a lock means for securing said frame member in the upright position.

12. The apparatus of claim 11 wherein said frame member includes a driven roller at the top which is adapted to engage and rotate a tubular member.

13. The apparatus of claim 12 wherein said frame member rotates to a position where said carriage means and said roller means travel along said rails over said frame member.

* * * * *